(12) United States Patent
Montes Usategui et al.

(10) Patent No.: US 8,637,803 B2
(45) Date of Patent: Jan. 28, 2014

(54) METHOD AND APPARATUS FOR MEASURING THE OPTICAL FORCES ACTING ON A PARTICLE

(76) Inventors: Mario Montes Usategui, Parets del Vallés (ES); Arnau Farré Flaquer, Puigpunyent (ES)

(*) Notice: Subject to any disclaimer, the term of this patent is extended or adjusted under 35 U.S.C. 154(b) by 245 days.

(21) Appl. No.: 13/320,503

(22) PCT Filed: May 14, 2010

(86) PCT No.: PCT/ES2010/000210
§ 371 (c)(1),
(2), (4) Date: Nov. 14, 2011

(87) PCT Pub. No.: WO2010/130852
PCT Pub. Date: Nov. 18, 2010

(65) Prior Publication Data
US 2012/0068059 A1    Mar. 22, 2012

(30) Foreign Application Priority Data
May 15, 2009 (ES) .................................. 200901259

(51) Int. Cl.
| H01J 40/14 | (2006.01) |
| G01N 21/00 | (2006.01) |
| H01S 1/00 | (2006.01) |
| G02B 21/32 | (2006.01) |

(52) U.S. Cl.
USPC ........ 250/222.2; 250/251; 250/216; 356/337; 356/340

(58) Field of Classification Search
USPC .............. 250/211, 221, 222.2, 224, 251, 526, 250/573, 574; 356/337, 340
See application file for complete search history.

(56) References Cited

U.S. PATENT DOCUMENTS

| 5,112,745 A | 5/1992 | Lorr |
| 5,198,369 A | 3/1993 | Itoh et al. |

(Continued)

OTHER PUBLICATIONS

Svoboda. "Biological Applications of Optical Forces", Annual Review of Biophysics and Biomolecular Structure, vol. 23, pp. 247-285, 1994 (the year of publication is sufficiently earlier than the effective U.S. filing date and any foreign priority date so that the particular month of publication is not in issue).

(Continued)

*Primary Examiner* — Bernard E Souw
(74) *Attorney, Agent, or Firm* — Peter B. Scull; Hamilton, DeSanctis & Cha, LLP

(57) ABSTRACT

An apparatus and method for measuring optical forces acting on a trapped particle. In one implementation the apparatus and method are adaptable for use in the optical train of an optical microscope that is configured to trap, with a single light beam, a particle suspended in a suspension medium between an entry cover and an exit cover of a chamber positioned on or within the microscope. The apparatus and method involves the use of a single collection lens system having a numerical aperture designed to be greater than or equal to an index of refraction index of the suspension medium intended to suspend the particle in the chamber which is placeable at or near the exit cover of the chamber of the microscope. A light sensing device is positioned at or near the back focal plane of the collection lens, or at an optical equivalent thereof, which is capable of directly or indirectly producing optical force measurements acting on the particle derived by the x and y coordinates of the centroid of the light distribution imaged onto the light sensing device by the collection lens.

24 Claims, 16 Drawing Sheets

(56) References Cited

U.S. PATENT DOCUMENTS

| 5,631,730 | A | * | 5/1997 | Chupp et al. ............... 356/73 |
|---|---|---|---|---|
| 6,477,298 | B1 | * | 11/2002 | Fletcher et al. ............. 385/33 |
| 7,133,132 | B2 | | 11/2006 | Bustamante et al. |
| 8,406,108 | B2 | * | 3/2013 | Nakagawa ............. 369/112.01 |
| 2007/0069119 | A1 | | 3/2007 | Appleyard et al. |
| 2007/0254279 | A1 | | 11/2007 | Goel |
| 2008/0121790 | A1 | | 5/2008 | Grier |

OTHER PUBLICATIONS

Gittes. "Interference model for back-focal-plane displacement detection in optical tweezers", Optics Letters vol. 23, pp. 7-9, Jan. 1, 1998.
Berg-Sorensen. "Power spectrum analysis for optical tweezers", Review of Scientific Instruments vol. 75, pp. 594-612, Mar. 2004.
Smith. "Overstretching B-DNA: The Elastic Response of Individual Double-Stranded and Single-Stranded DNA Molecules", Science, vol. 271, pp. 795-799, Feb. 9, 1996.
Smith. "Optical-Trap Force Transducer That Operates by Direct Measurement of Light Momentum", Methods of Enzymology, vol. 361, pp. 134-162, 2003 (the year of publication is sufficiently earlier than the effective U.S. filing date and any foreign priority date so that the particular month of publication is not in issue).
Grange. "Optical tweezers system measuring the change in light momentum flux", Review of Scientific Instruments, vol. 23, No. 6, pp. 2308-2316, Jun. 2002.
Smith. "Stretch Transitions Observed in Single Biopolymer Molecules (DNA or Protein) using Laser Tweezers", University of Twente, The Netherlands, Oct. 16, 1998.
Neuman. "Optical trapping (review article)", Review of Scientific Instruments, vol. 75, pp. 2787-2809, Sep. 2004.

* cited by examiner

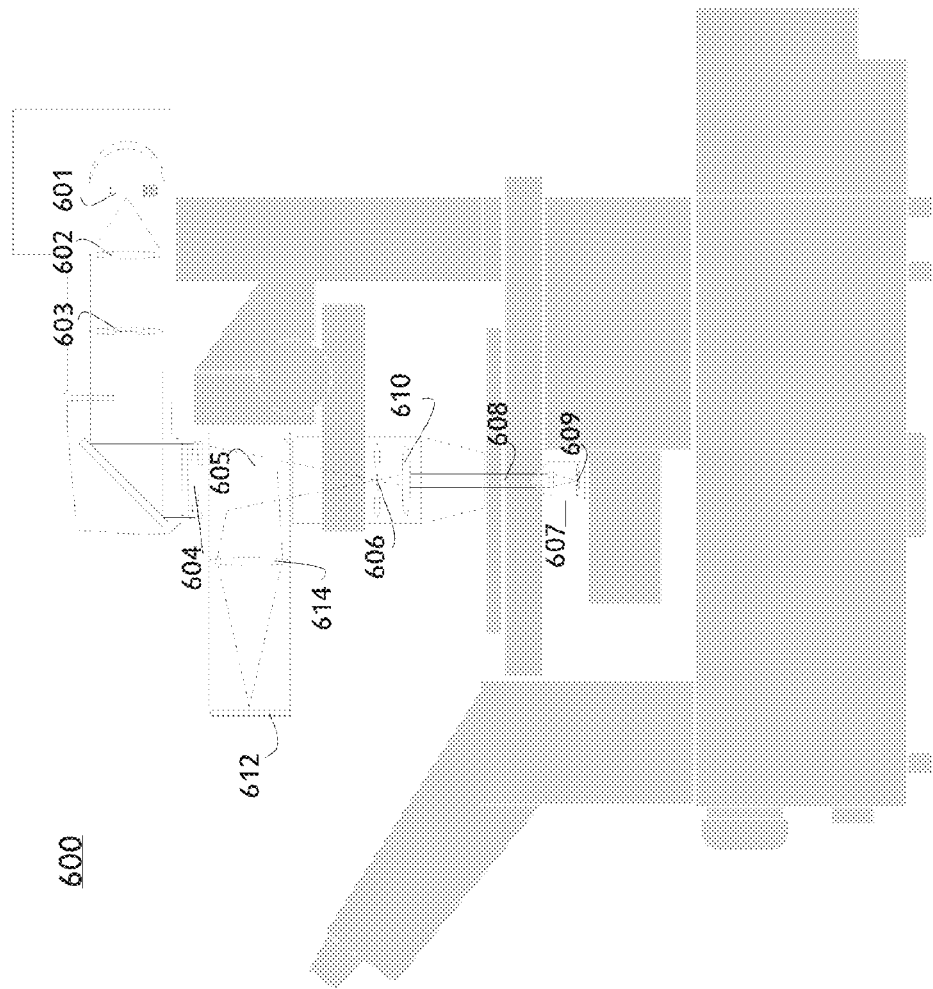

METHOD AND APPARATUS FOR MEASURING THE OPTICAL FORCES ACTING ON A PARTICLE

The invention relates to a system and methods for measuring optical forces acting on a microscopic sample, and more particularly to a system and methods for determining the force components acting on a trapped particle in an optical tweezers assembly.

BACKGROUND ART

There are essentially two prior art methodologies, "indirect" and "direct", for measuring optical forces acting on a trapped microscopic sample. The indirect methods generally have in common the use of a single-beam laser which require the use of complex mathematical models of the trap (harmonic potential) and of the environment (fluid with a homogeneous index of refraction and viscosity, under low Reynolds number conditions) to determine forces acting on a sample that must be spherical in form. The method of indirectly measuring forces on a trapped sample is disclosed in Svoboda, K. & Block, S. M. "Biological Applications of Optical Forces", Annual Review of Biophysics and Biomolecular Structure Vol. 23, pp. 247-285 (1994) and references therein and also in the patent J. Finer, R. Simmons, J. Spudich and S. Chu, "Optical trap system and method", U.S. Pat. No. 5,512,745 (1996). Also, the theory behind the measurement method is disclosed in Gittes, F. & Schmidt, C. F. "Interference model for back-focal-plane displacement detection in optical tweezers", Optics Letters Vol. 23, pp. 7-9 (1998) and a calibration procedure for determining the stiffness constant of the optical trap in K. Berg-Sørensen and H. Flyvbjerg, "Power spectrum analysis for optical tweezers", Review of Scientific Instruments Vol. 75, pp. 594-612 (2004).

The "indirect" single-beam systems have many inadequacies. For example, the measurements depend on many experimental variables that change from experiment to experiment (e.g., temperature, relative index of refraction between sample and medium, size of samples, laser power, numerical aperture of the objective, etc.). In practice, it is necessary to recalibrate these systems each time they are used. This is a complex procedure that requires specialized equipment (piezo actuators) and human expertise which make the systems impractical for commercial use. There are a number of other problems associated with the "indirect" single-beam methods. First, it is not possible to measure forces on non-spherical samples. They require the use of microsphere "handles". Second, it is not possible to make measurements with non-gaussian laser beams because these do not produce harmonic potentials. This leaves aside beams with interesting characteristics such as the periodic potentials used in optical sorting or the Bessel and Laguerre-Gauss beams, which induce rotations. Third, it is not possible to make measurements in non-homogeneous media, which limits the feasible experiments essentially to those performed in vitro. An important example is experiments inside living cells, which are not possible since the optical properties of the cytosol change from point to point. The cell has to be recreated in a simplified form. In fact, part of the merit of an experiment with optical tweezers in the cellular domain consists of the ability to overcome this difficulty.

The prior art "direct" methods for measuring optical forces on a trapped force require the use of two counter-propagating laser beams. This method has been disclosed in U.S. Pat. No. 7,133,132 (Bustamante et al.) and in two preceding articles entitled "Overstretching B-DNA: The Elastic Response of Individual Double-Stranded and Single-Stranded DNA Molecules", Science, Vol. 271, pp. 795-799 (1996) and "Optical-Trap Force Transducer That Operates by Direct Measurement of Light Momentum", Methods of Enzymology, Vol. 361, pp.134-162 (2003). The method has also been described by Grange et al. in an article entitled "Optical tweezers system measuring the change in light momentum flux", Review of Scientific Instruments, Vol. 23, No. 6, pp. 2308-2316 (2002) and in S. Smith doctoral thesis: "Stretch Transitions Observed in Single Biopolymer Molecules (DNA or Protein) using Laser Tweezers", University of Twente, The Netherlands (1998).

The prior art "direct" methods for measuring optical forces acting on a trapped sample do so by measuring the force directly by means of momentum changes. These prior art traps are based on dual counter-propagating beams which require duplicated and specific optical setups (two lasers, two telescopes, two microscope objectives, two PSD detectors, etc.) which make them infeasible for integration within the optical trains of commercial microscopes and currently available optical tweezer systems.

Moreover, the use of duplicated optical components makes these systems expensive and more difficult to operate. An important point is that the opinion among those skilled in the art is that the use of single-beam traps for measuring forces using the "direct" method is impossible. Bustamante et al., proclaims so on page 140 in the article entitled "Optical-Trap Force Transducer That Operates by Direct Measurement of Light Momentum" discussed above. Neuman et al. proclaims the same on page 2802 in the article "Optical trapping (review article)", Review of Scientific Instruments, 75, 2787-2809 (2004). Williams opines the same on page 5 of the thesis entitled "Optical Tweezers: Measuring Piconewton Forces". Also, Grange et al. in the article entitled "Optical tweezers system measuring the change in light momentum flux" observes the same in page 2308 and S. Smith in his PhD thesis "Stretch Transitions Observed in Single Biopolymer Molecules (DNA or Protein) using Laser Tweezers" is of that same opinion in page 17.

A reason for this opinion is that those skilled in the art believe that a single beam trap would require a narrow cone of light if that cone of light is to be captured (for analysis) by a collecting lens despite the deflection induced by the sample. They believe that if a high numerical aperture lens is used instead, the outermost exiting rays could not be collected by the analysing lens. That required narrowness of the cone of light is insufficient to trap objects since the scattering force due to reflected light would overcome the axial gradient (trapping) force To avoid the dilemma a counter-propagating lens design is used to create the traps at the expense of a higher experimental complexity.

What is needed is a simplified system and method for measuring optical forces acting on a trapped sample which solves the aforementioned problems.

SUMMARY OF THE INVENTION

In accordance with one aspect of the present invention a system is provided that includes a light source for generating a single light beam, a chamber for containing a particle in a suspension medium, a trap objective lens for focusing the light beam on the particle in a manner to cause light beam photons to trap the particle by use of high gradient forces, a single collection lens system positioned to capture both photons deflected by the particle and photons not deflected by the particle; and a light sensing device positioned at or near the back focal plane of the collection lens, or at an optical equivalent thereof.

In accordance with another aspect of the present invention a system is provided that includes a light source for generating a single light beam, a chamber for containing a particle in a suspension medium, a high numerical aperture trap objective lens for focusing the light beam on the particle in a manner to cause light beam photons to trap the particle by use of high gradient forces, a single collection lens system positioned to capture in the upper hemisphere of the particle to be trapped both photons deflected by the particle and photons not deflected by the particle, the collection lens having a numerical aperture greater than or equal to the index of refraction of a suspension medium intended to suspend the particle in the chamber; and a light sensing device positioned at or near the back focal plane of the collection lens, or at an optical equivalent thereof.

In accordance with another aspect a method is provided for measuring optical forces acting on a particle comprising suspending the particle in a suspension medium within a chamber, focusing a single light beam on the particle to cause beam photons to trap the particle by use of high gradient forces, capturing photons deflected by the particle and photons not deflected by the particle by a single collection lens system by controlling the distance of the particle with respect to the collection lens and by controlling the refraction of the photons leaving the chamber; and directing the captured photons to a light sensing device located at or near the back focal plane of the collection, or at an optical equivalent thereof.

In accordance with another aspect a system is provided that is adaptable for placement in the optical train of an optical microscope that is configured to trap with a single light beam a particle suspended in a suspension medium between an entry cover and an exit cover of a chamber, the system comprising a single collection lens for placement at or near the exit cover of the chamber of the microscope, the numerical aperture of the collection lens designed to be greater than or equal to an index of refraction index of the suspension medium intended to suspend a particle in the chamber, a light sensing device positioned at or near the back focal plane of the collection lens, or at an optical equivalent thereof, the light sensing device capable of directly or indirectly producing optical force measurements acting on the particle derived by the x and y coordinates of the centroid of the light distribution imaged onto the light sensing device. In an embodiment, the collection lens and light sensing device are incorporated into a single device.

In accordance with another aspect a system is provided that is adaptable for placement in the optical train of an optical microscope that is configured to trap with a single light beam a particle suspended in a suspension medium between an entry cover and an exit cover of a chamber, the system comprising a single collection lens system for placement at or near the exit cover of the chamber of the microscope to capture in the upper hemisphere of the particle photons deflected by the particle and photons not deflected by the particle, the numerical aperture of the collection lens designed to be greater than or equal to a refraction index of the suspension medium intended to suspend the particle in the chamber, a light sensing device positioned at or near an optical equivalent of the back focal plane of the collection lens, the light sensing device capable of directly or indirectly producing optical force measurements acting on the particle derived by the x and y coordinates of the centroid of the light distribution imaged onto the light sensing device: and a relay lens positioned between a front lens of the collection lens and the light sensing device to create the optical equivalent of the back focal plane. In an embodiment, the collection lens, relay lens and light sensing device are incorporated into a single device.

In accordance with another aspect a system is provided that is adaptable for placement in the optical train of an optical microscope that is configured to trap with a single light beam a particle suspended in a suspension medium between an entry cover and an exit cover of a chamber, the system comprising a single collection lens system for placement at or near the exit cover of the chamber of the microscope to capture in the upper hemisphere of the particle photons deflected by the particle and photons not deflected by the particle, the numerical aperture of the collection lens designed to be greater than or equal to a refraction index of the suspension medium intended to suspend the particle in the chamber, a light sensing device positioned at or near the optical equivalent of the back focal plane of the collection lens, the light sensing device capable of directly or indirectly producing optical force measurements acting on the particle derived by the x and y coordinates of the centroid of the light distribution imaged onto the light sensing device, a relay lens positioned between a front lens of the collection lens and the light sensing device to create the optical equivalent of the back focal plane; and a filter positioned between a front lens of the collection lens and the light sensing device to prevent saturation of the light sensing device. In an embodiment, the collection lens, relay lens, filter and light sensing device are incorporated into a single device.

In accordance with another aspect a system is provided that is adaptable for placement in the optical train of an optical microscope that is configured to trap with a single light beam a particle suspended in a suspension medium between an entry cover and an exit cover of a chamber, the system comprising a single collection lens system for placement at or near the exit cover of the chamber of the microscope to capture in the upper hemisphere of the particle photons deflected by the particle and photons not deflected by the particle, the numerical aperture of the collection lens designed to be greater than or equal to a refraction index of the suspension medium intended to suspend the particle in the chamber, a light sensing device positioned at or near the optical equivalent of the back focal plane of the collection lens, the light sensing device capable of directly or indirectly producing optical force measurements acting on the particle derived by the x and y coordinates of the centroid of the light distribution imaged onto the light sensing device, a relay lens positioned between a front lens of the collection lens and the light sensing device to create the optical equivalent of the back focal plane; and a transmission mask positioned between a front lens of the collection lens and the light sensing device that compensates for reflection losses produced at the chamber of the microscope. In an embodiment, the collection lens, relay lens, transmission mask and light sensing device are incorporated into a single device.

In accordance with another aspect a system is provided that is adaptable for placement in the optical train of an optical microscope that is configured to trap with a single light beam a particle suspended in a suspension medium between an entry cover and an exit cover of a chamber, the system comprising a single collection lens system for placement at or near the exit cover of the chamber of the microscope to capture in the upper hemisphere of the particle photons deflected by the particle and photons not deflected by the particle, the numerical aperture of the collection lens designed to be greater than or equal to a refraction index of the suspension medium intended to suspend the particle in the chamber, a light sensing device positioned at or near the optical equivalent of the back focal plane of the collection lens, the light sensing device capable of directly or indirectly producing optical force measurements acting on the particle derived by the x and y coordinates of the centroid of the light distribution imaged onto the light sensing device, a relay lens positioned between a front lens of the collection lens and the light sensing device to create the optical equivalent of the back focal plane, a filter positioned between a front lens of the collection lens and the light sensing device to prevent saturation of the light sensing device; and a transmission mask positioned between a front lens of the collection lens and the light sensing device that compensates for reflection losses produced at the chamber of the microscope. In an embodiment, the collection lens, relay lens, filter, transmission mask and light sensing device are incorporated into a single device.

In accordance with another aspect a system is provided that is adaptable for placement in the optical train of an optical microscope that is configured to trap with a single light beam a particle suspended in a suspension medium between an entry cover and an exit cover of a chamber, the system comprising a single collection lens system for placement at or near the exit cover of the chamber of the microscope to capture in the upper hemisphere of the particle photons deflected by the particle and photons not deflected by the particle, the numerical aperture of the collection lens designed to be greater than or equal to a refraction index of the suspension medium intended to suspend the particle in the chamber, a light sensing device positioned at or near the back focal plane of the collection lens, the light sensing device capable of directly or indirectly producing optical force measurements acting on the particle derived by the x and y coordinates of the centroid of the light distribution imaged onto the light sensing device; and a filter positioned between a front lens of the collection lens and the light sensing device to prevent saturation of the light sensing device. In an embodiment, the collection lens, filter and light sensing device are incorporated into a single device.

In accordance with another aspect a system is provided that is adaptable for placement in the optical train of an optical microscope that is configured to trap with a single light beam a particle suspended in a suspension medium between an entry cover and an exit cover of a chamber, the system comprising a single collection lens system for placement at or near the exit cover of the chamber of the microscope to capture in the upper hemisphere of the particle photons deflected by the particle and photons not deflected by the particle, the numerical aperture of the collection lens designed to be greater than or equal to a refraction index of the suspension medium intended to suspend the particle in the chamber, a light sensing device positioned at or near the back focal plane of the collection lens, the light sensing device capable of directly or indirectly producing optical force measurements acting on the particle derived by the x and y coordinates of the centroid of the light distribution imaged onto the light sensing device; and a transmission mask positioned between a front lens of the collection lens and the light sensing device that compensates for reflection losses produced at the chamber of the microscope. In an embodiment, the collection lens, transmission mask and light sensing device are incorporated into a single device.

In accordance with another aspect a system is provided that is adaptable for placement in the optical train of an optical microscope that is configured to trap with a single light beam a particle suspended in a suspension medium between an entry cover and an exit cover of a chamber, the system comprising a single collection lens system for placement at or near the exit cover of the chamber of the microscope to capture in the upper hemisphere of the particle photons deflected by the particle and photons not deflected by the particle, the numerical aperture of the collection lens designed to be greater than or equal to a refraction index of the suspension medium intended to suspend the particle in the chamber, a light sensing device positioned at or near the back focal plane of the collection lens, the light sensing device capable of directly or indirectly producing optical force measurements acting on the particle derived by the x and y coordinates of the centroid of the light distribution imaged onto the light sensing device, a filter positioned between a front lens of the collection lens and the light sensing device to prevent saturation of the light sensing device; and a transmission mask positioned between a front lens of the collection lens and the light sensing device that compensates for reflection losses produced at the chamber of the microscope. In an embodiment, the collection lens, filter, transmission mask and light sensing device are incorporated into a single device.

Throughout the description and claims the word "comprise" and variations of the word, are not intended to exclude other technical features, additives, components, or steps.

Additional objects, advantages and features of the invention will become apparent to those skilled in the art upon examination of the description or may be learned by practice of the invention. The following examples and drawings are provided by way of illustration, and they are not intended to be limiting of the present invention. Furthermore, the present invention covers all possible combinations of particular and preferred embodiments described herein.

DETAILED DESCRIPTION OF PARTICULAR EMBODIMENTS

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention. It is also important to note that the accompanying drawings are not drawn to scale.

Figure 1:
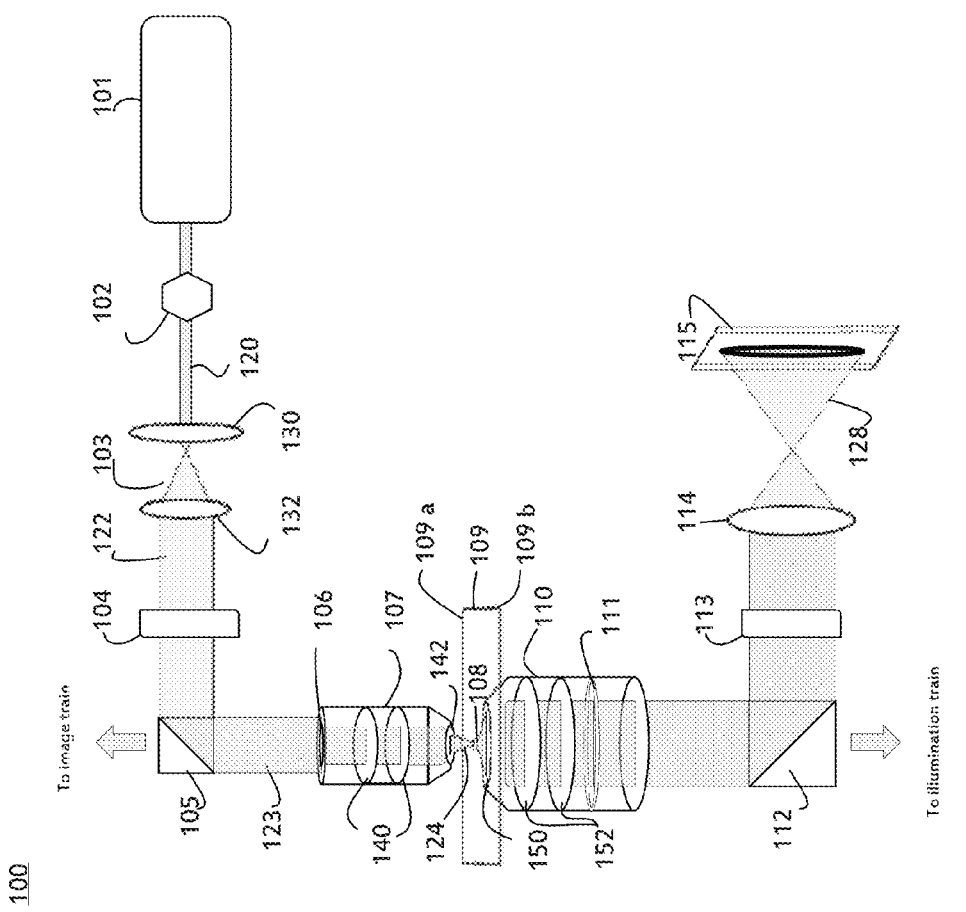
FIG. 1 illustrates a system of one embodiment of the present invention for trapping a particle and measuring optical forces acting on the trapped particle.

FIG. 1 illustrates a system 100 for measuring optical forces acting on a particle 108 in accordance with one implementation of the present invention. System 100 includes a chamber 109 for suspending a particle 108 in a suspension fluid between an entry cover 109a and an exit cover 109b which are typically made of glass. Trapping of particle 108 is achieved by focusing a light beam 124 on the suspended particle with the use of a high numerical aperture trap objective immersion lens 107 in a manner to cause light beam photons to trap the particle by use of high gradient forces. In the embodiment of FIG. 1, a laser source 101 is used to create a laser beam 120 that may be manipulated in a way to create the trapping light beam 124. The laser source 101 is preferably a high power laser source having a rated power from some hundreds of milliwatts to several watts. A Faraday isolator 102 positioned at the laser source 101 outlet may be used to eliminate back reflections towards the laser source 101 that could cause power instabilities. A telescope 103 having an eye piece lens 130 and an objective lens 132 is located in the optical path of laser beam 120 where the laser beam is recollimated and expanded by the objective lens 132. In a preferred embodiment, the focal length of lenses 132 and 130 are selected to create a laser beam 122 having a diameter that fills or slightly over fills the entrance pupil 106 of the trap objective 107. In instances where the laser beam 122 has a linear, or otherwise non-circular polarization, a half-wave plate 104, or other suitable device, can be positioned between the telescope objective 132 and the trap objective 107 to create a light beam 123 having a circular, or substantially circular, polarization. A light beam entering the trap objective 107 with a circular, or substantially circular, polarization enables the trap objective to create an optical trap with equal, or substantially equal, radial stiffness in two perpendicular directions.

As stated above, system 100 makes use of a single light beam 124 to trap particle 108 by the use of high gradient forces. To create the high gradient forces necessary to effectively trap the particle, a high numerical aperture trap objective 107 is used to focus the beam down to a diffraction-limited spot onto the particle. Trap objective 107 generally includes an entrance pupil 106, a series of internal lenses 140 and an exit lens 142 that interfaces with the entry cover 109a of chamber 109 via an immersion medium (not shown) such as water or oil, preferably oil. In alternative embodiments, the numerical aperture of the trap objective 107 preferably varies between about 0.90 and about 1.40. To achieve a filling or overfilling of the entrance pupil 106, the telescope 103 preferably has a magnification between about 2.5× and about 6.0×.

The measurement of optical forces acting on particle 108 is achieved by capturing photons deflected by the particle and photons not deflected by the particle with the use of a high numerical aperture immersion lens 110 having a numerical aperture greater than or equal to the index of refraction of the medium that suspends the particle 108 within chamber 109. Collection lens 110 generally includes a front lens 150 and a series of internal lenses 152 that collimate and direct the captured photons towards a light sensing device 115. The front lens 150 interfaces with the exit cover 109b of chamber 109 via an immersion medium (not shown) such as water or oil, preferably oil. In alternative embodiments, the numerical aperture of the collection lens 110 preferably varies between about 1.32 and about 1.40. In particular, it is desirable that a relatively large difference exist between the index of refraction of the particle suspension medium and the collection lens immersion medium. In alternative embodiments, the ratio of the index of refraction of the immersion medium and suspension medium preferably varies between about 1.13 and about 1.2 and the diameter of the front lens 150 varies between about 2.0 millimeters and about 20 millimeters.

The direct measurement of optical forces acting on particle 108 is made possible by the fact that the momentum structure of a light field becomes visible at the back focal plane 111 of collection lens 110. By virtue of FIG. 2 and the description that follows, the theory behind this phenomenon is explained.

Any solution to Helmholtz's wave equation can be written as:

$$U(x, y, z) = \int\int_{-\infty}^{\infty} A e^{i\vec{k}\cdot\vec{r}} d\alpha d\beta = \int\int_{-\infty}^{\infty} A(\alpha, \beta) e^{i\frac{2\pi}{\lambda}(\alpha x + \beta y + \gamma z)} d\alpha d\beta \quad (1)$$

where the weight factors $A(\alpha, \beta)$ fulfill:

$$A(\alpha, \beta) = \int\int_{-\infty}^{\infty} U(x, y, 0) e^{-i\frac{2\pi}{\lambda}(\alpha x + \beta y)} dx dy \quad (2)$$

That is, they are the Fourier transform of the original field at an arbitrary plane z=0.

These equations have a physical meaning: any electromagnetic field can be thought of as a superposition of plane waves, A, with amplitudes A given by Equation 2. Plane waves are the simplest type of wave as they are formed by a bundle of photons all traveling in the same direction given by direction cosines $s=(\alpha, \beta, \gamma)$. Relevant for our method is that the momentum in a plane wave is determined by:

$$\vec{p} = \hbar \vec{k} \Rightarrow (p_x, p_y, p_z) = \hbar \frac{2\pi}{\lambda}(\alpha, \beta, \gamma) \quad (3)$$

In other words, a plane wave is composed of photons all having the same momentum p and Equation (1) above can thus be thought of as a decomposition of a given light field into its constituent momenta. Also, the energy per unit time (and unit area) carried by these elementary plane waves is proportional to amplitudes $A(\alpha, \beta)$ squared (the irradiance $I(\alpha, \beta)$) according to Poynting's theorem. Thus, the three equations above show that the number of photons (which is proportional to the energy) per unit time in field $U(x,y,z)$ having momentum p, is proportional to the magnitude squared of the Fourier Transform of the field. Importantly, under coherent illumination and regardless of irrelevant phase and scale factors, the light distribution at the back-focal plane of a lens corresponds to the Fourier transform of the field before the lens. This capacity of lenses to perform Fourier transforms is Valid even at high-numerical apertures, if they are designed to fulfill Abbe's sine condition (r=f' sin Θ, in FIG. 2), a widely met aberration correction specification.

Figure 2:
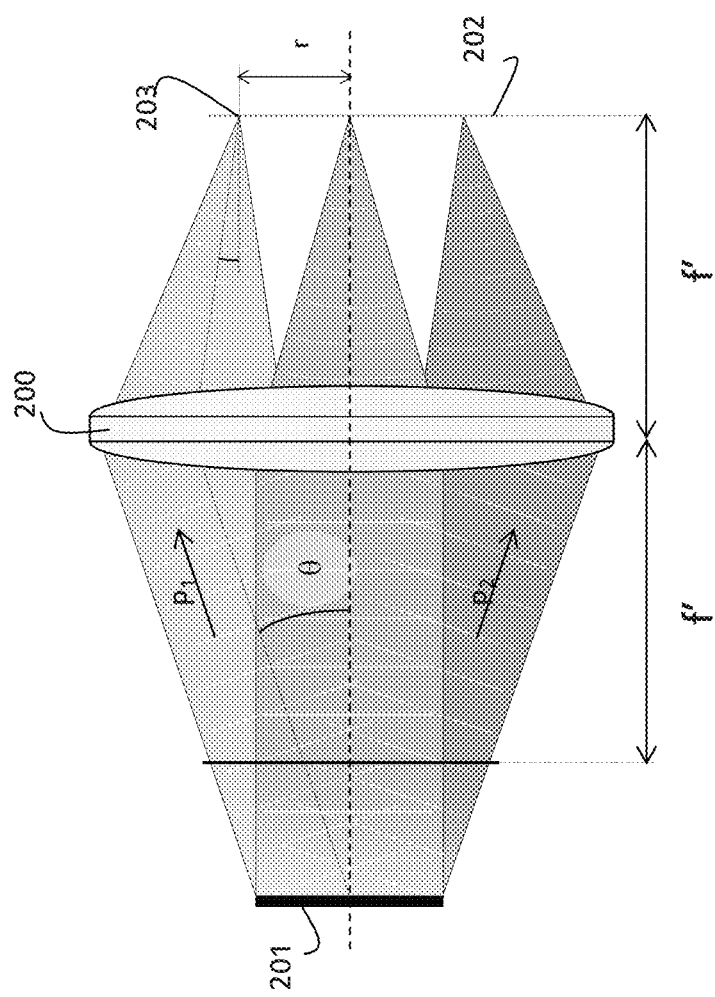
FIG. 2 illustrates the momentum structure of a coherent light distribution at the back focal plane of a lens.

Referring to FIG. 2, at the back-focal plane 202 of a lens 200 we can see the momentum structure of the coherent light distribution in plane 201: the radiant power at a point 203 in that plane directly indicates the number of photons that carry momentum $p_1$. Since the momentum structure of a light field becomes visible at the back focal plane of a lens, any change in this momentum structure is easily detected. This provides a direct method for evaluating the force exerted by the field onto the sample. Newton's second law equates force exerted on a body with its net momentum change per unit time. Also, the force exerted by the photons on the sample has the same magnitude as that exerted by the sample on the photons (Newton's third law), and is equal to the change in momentum of the light beam photons, which is readily apparent at the back focal plane. Subtraction of the momentum before and after light enters the sample provides the required change.

Figure 3B:
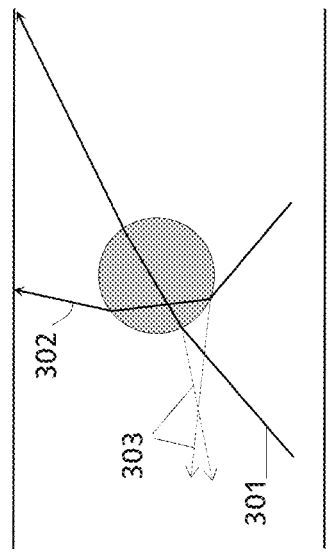
FIGS. 3A and 3B are examples of convergent light rays that are refracted and deflected by a trapped sample.
Figure 3A:
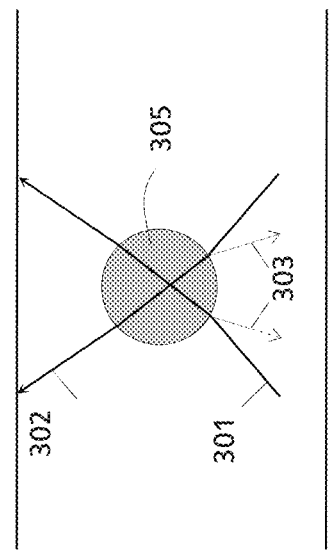
Figure 4:
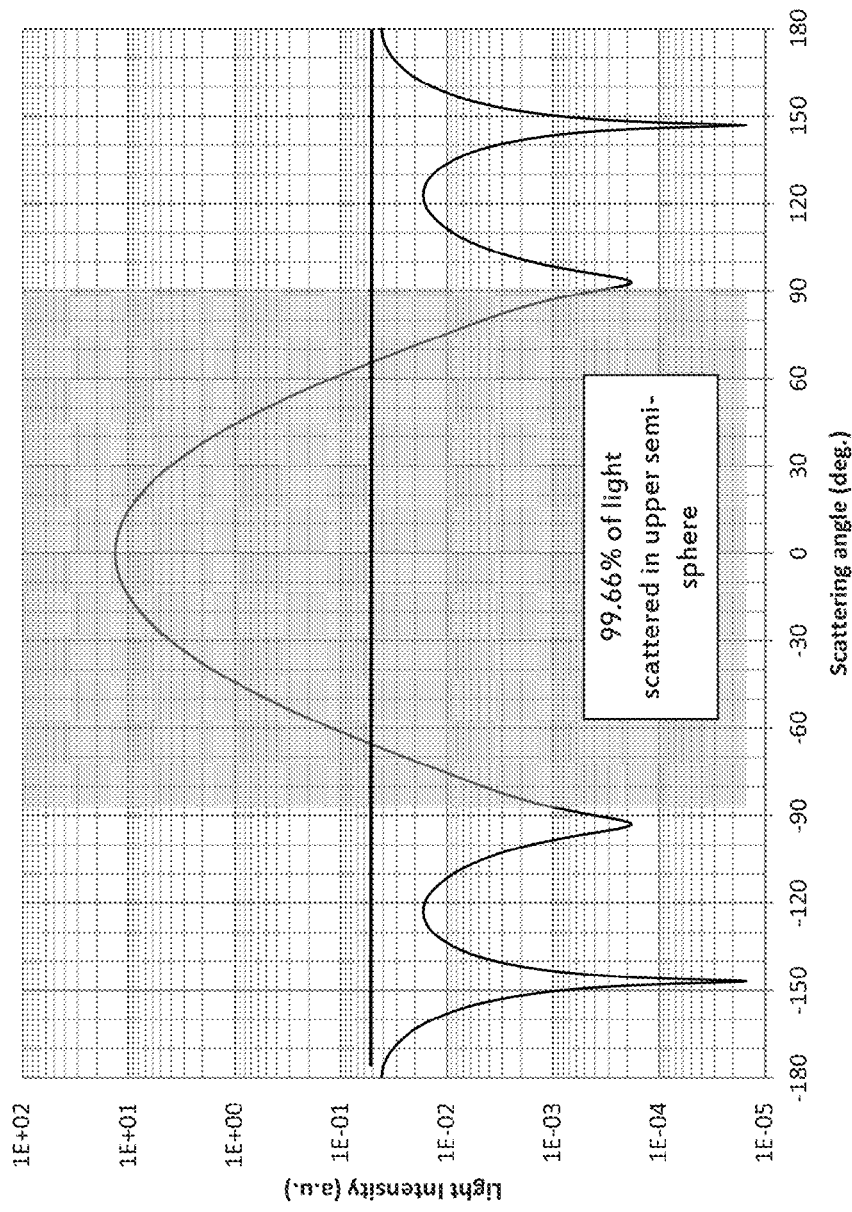
FIG. 4 is a plot of the intensity of scattered light as a function of angle, for a homogeneous glass microsphere suspended in water.

Turning now to FIG. 3A, a converging light beam 301 is shown impinging on a micro-particle 305 to optically trap the particle. In FIG. 3A, the micro-particle 305 is shown centered with respect to the focus of the beam 301. Describing the interaction in terms of ray optics, light can be refracted 302 or reflected 303 resulting in directional changes of propagation. Directional changes may increase when the sample is shifted laterally with respect to the converging light beam 301, as illustrated in FIG. 3B. As shown, a lateral shift of the sample can cause the refracted light rays 302 and reflected light rays 303 to propagate in almost any direction. As a consequence, to be able to analyze all light beam momentum changes, it would be necessary to collect light at all points around the sample, that is, covering a $4\pi$ solid angle. However, it has been determined by the inventors that neglecting back-scattered light generally gives rise to a small and bearable error. As an illustration, FIG. 4 depicts a plot of the intensity of scattered light (in arbitrary units, logarithmic scale) as a function of angle, for a homogeneous glass microsphere (r=1 μm, n=1.56) suspended in water (n=1.32), trapped in a focused infrared laser beam ($\lambda$=1.064 μm, NA=1), computed through the rigorous generalized Lorenz-Mie theory. As shown by FIG. 4, scattered light into the lower hemisphere of the sample accounts for less than 1% of the total light intensity. The present invention takes advantage of this phenomenon by maximizing the amount of light captured within the upper hemisphere of a sample and by permitting the back-scattered light to be ignored when measuring the optical forces acting on the sample. Light capture in the upper hemisphere is maximized by the use of a high numerical aperture immersion collection lens 110 as described above. This results in many advantages and permits a much simpler optical arrangement for collecting light. Notably, it enables the system and/or devices of the present invention to be incorporated or retrofitted into the optical trains of conventional optical microscopes and into existing optical trap systems.

Figure 5:
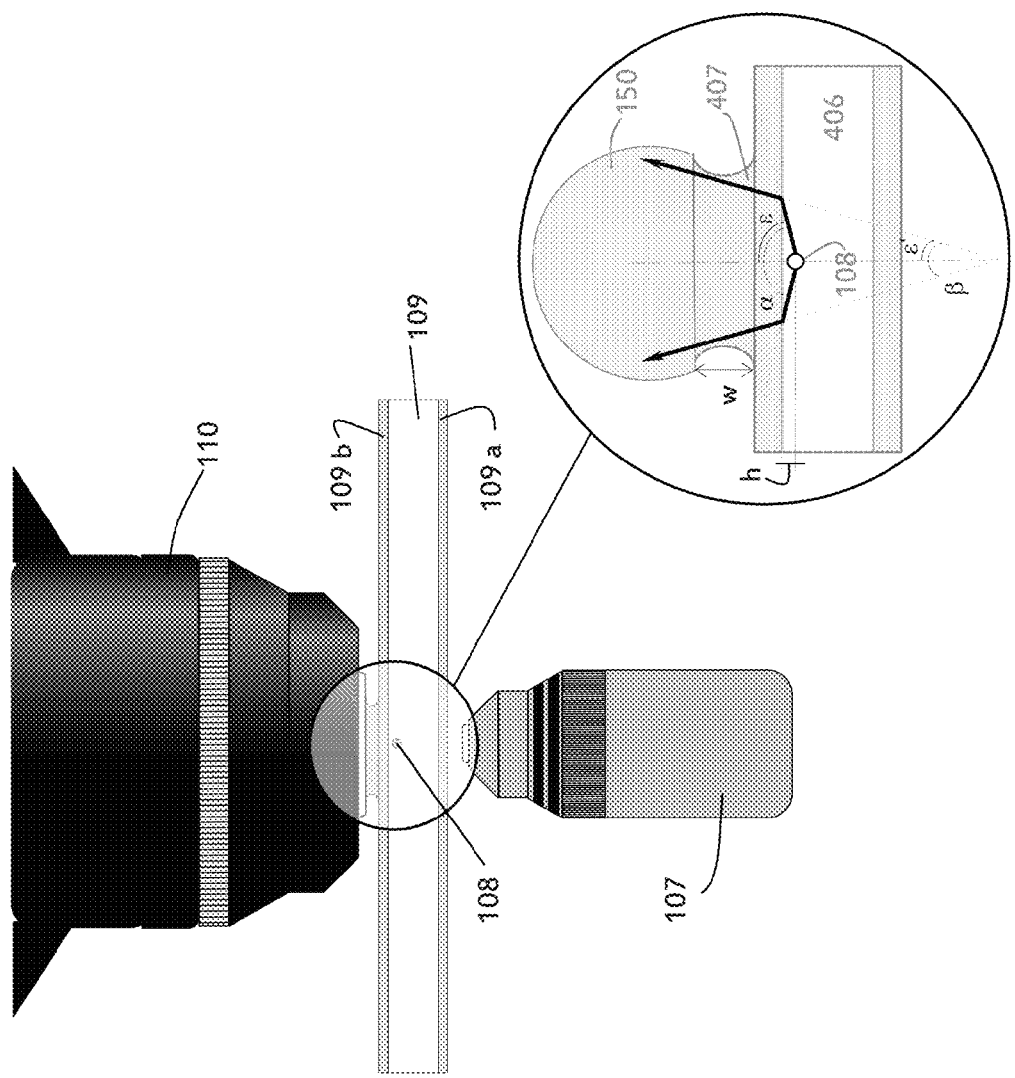
FIG. 5 illustrates a light collection system in one embodiment of the present invention.

With reference to FIG. 5, and by way of example, a collection system in accordance with one embodiment of the present invention is illustrated. As previously described, the sample 108 lies inside a chamber 109 containing a suspension medium 406, such as water (n=1.333), sandwiched between an entry cover 109a and exit cover 109b. The front lens 150 of the collection lens 110 is in contact with a high refractive index fluid 407, such as cedar or synthetic microscopy oil (n'=1.515), which, in a preferred embodiment, matches the index of refraction of the exit cover 109b and the front lens 150. As shown, light deflected from the sample 108 which propagates in the direction of collection lens 110 making a large angle $\alpha$ (semi-angle $\epsilon$) with respect to the optical axis gets refracted at the water-exit cover 109b interface according to Snell's law:

$$n \cdot \sin \epsilon = n' \cdot \sin \epsilon' \quad (4)$$

and proceeds undeflected into the front lens 150 of collecting lens 110 making a smaller angle $\beta$ (semi-angle $\epsilon'$). Because the numerical aperture of the collection lens 110 is selected to be greater than or equal to the index of refraction of the suspension medium 406, the refracted angle $\epsilon'$ is:

$$n \cdot \sin 90° = n = n' \cdot \sin \epsilon' \leq NA = n' \sin \theta => \epsilon' \leq \theta \quad (5)$$

Or, in other words, the refracted rays remain within the capturing angle θ of the collection lens.

To take advantage of the full numerical aperture of the collecting system, the working distance, w, between the exit cover 109b of chamber 109 and the front lens 150 of collection lens 110 is controlled. In one embodiment, a spacer (not shown) is positioned between the exit cover 109b and the collection lens 110 to maintain the working distance at a predetermined value to meet the validity conditions of Equation (5). When the working distance is too small or too large, the effective numerical aperture is unnecessarily limited, leading to detrimental light losses. In alternative embodiments of the present invention the working distance is preferably maintained below 3 millimeters and preferably between about 1.0 millimeters and about 3.0 millimeters, and more preferably between about 1.5 millimeters and about 2.5 millimeters.

Figure 6:
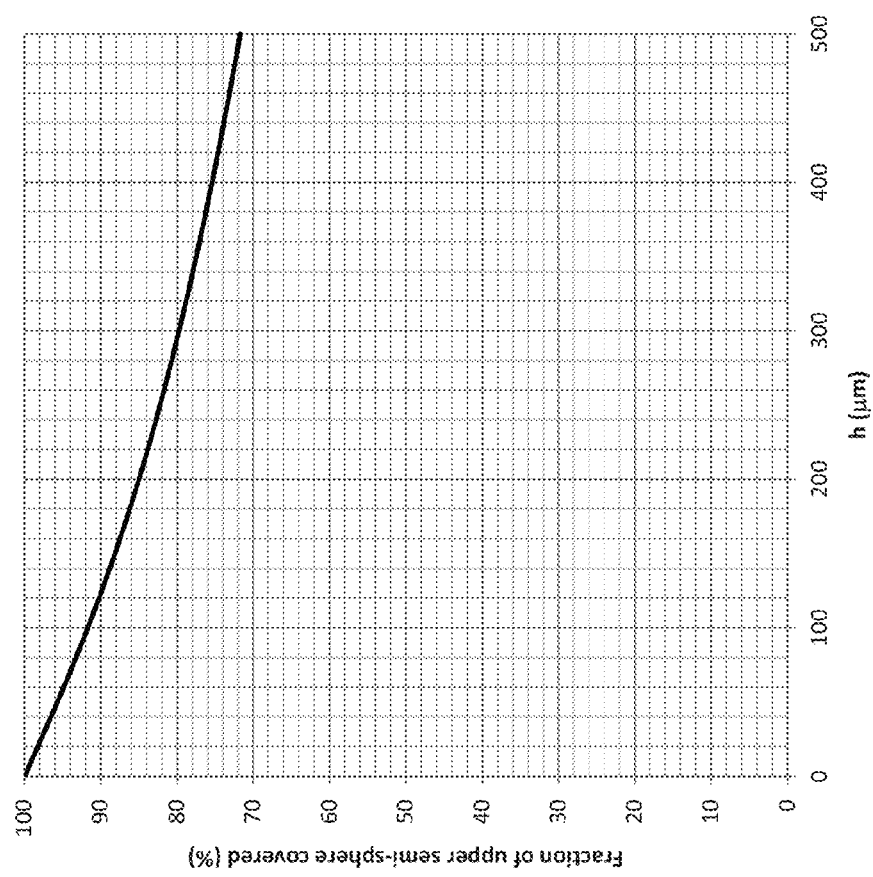
FIG. 6 is a graph showing the percent fraction of the light captured in the upper hemisphere of a sample as a function of the depth of the sample in a suspension chamber

Another important consideration is the depth, h, location of the sample 108 with respect to the inside surface of the exit cover 109b of chamber 109. The results of FIG. 6 show the percent fraction of the light captured in the upper hemisphere of a sample as a function of the depth of the sample in chamber 109. Data was computed with the following collection lens 110 parameters: (1) numerical aperture (NA) of collection lens=1.40, (2) index of refraction of oil immersion (n') between front lens 150 and exit cover 109b=1.51, (3) index of refraction of the sample suspension medium (n)=1.33, (4) diameter of front lens=9.5020 mm and (5) the working distance=1.92 mm. As shown in FIG. 6, to capture a vast majority of light propagating from the upper hemisphere, the depth of the sample is preferably between 0 and about 200 micrometers, more preferably between 0 and about 100 micrometers, and most preferably between about 0 and 50 micrometers. As a result of these findings, the present invention makes use of thin microfluidic chambers 109 to keep the samples 108 close to both the collecting lens 110 and to the trap objective lens 107. In accordance with alternative embodiments of the present invention the thickness of chamber 109 is preferably between about 50 to about 200 microns. To permit the sample 108 to be trapped at a greater distance from the entry cover 109a of chamber 109, a water-immersion trap objective lens 107 may be used that permits distances of several hundreds of microns without degraded performance. The use of a water immersion trap objective 107 advantageously permits the use of thicker microfluidic chambers 109.

With continued reference to FIG. 1, a light sensing device 115 is provided in the down stream optical path of the collection lens 110. The force acting on the trapped particle 108 can be obtained by adding up the individual momentum changes of all the photons in the light 128 imaged onto the light sensing device 115. In accordance with one embodiment, this is done by placing a two-dimensional position sensing device (PSD) based on the lateral effect, at the back-focal plane 111 of the collection lens, or at an optical equivalent. Lateral effect PSD's are photodetectors that respond with photocurrents proportional to both the radiant power of a light spot illuminating an exposed resistive layer, as well as to the distance between the illuminated spot and reference electrodes. Two-dimensional PSD's thus provide at least two signals that permit them to measure the position of a light spot in the illuminated area, according to:

$$S_x = k \int I(x,y) x \, dx \, dy$$

$$S_y = k \int I(x,y) y \, dx \, dy \quad (6)$$

where k is a constant determined by the detector's responsivity and geometry and I(x,y) stands for the irradiance of the illuminating light at the (x,y) location 203 of the sensing area. When placed at the back-focal plane of the decomposing lens, coordinates x and y represent the transverse components of light momenta in a proper scale:

$$x = \frac{\lambda f^t}{h} p_x \quad (7)$$

$$y = \frac{\lambda f^t}{h} p_y$$

In effect:

$$p_x = \hbar \frac{2\pi}{\lambda} \alpha = \hbar \frac{2\pi}{\lambda} \sin\theta \quad (7')$$

by virtue of equation 3, which according to Abbe's sine condition can be written as:

$$p_x = \hbar \frac{2\pi}{\lambda} \frac{x}{f'} \Rightarrow x = \frac{\lambda f'}{h} p_x \quad (7'')$$

q.e.d. And equivalently for the y coordinate. Since I(x,y)dxdy is the radiant power at point (x,y) and thus proportional to the number of photons per unit time having transverse momentum $(p_x, p_y)$, the integrals in Equation 6 represent, respectively, the orderly addition of the x and y components of all the momenta. Change in signals Sx and Sy after and before light goes through the sample are thus proportional to the light force.

An advantage of the present invention is that force measurements can be based solely on first principles. In the embodiment of FIG. 1 the light sensing device lies outside the collection lens 110 and a relay lens 114 is used to image an optical equivalent of the back focal plane 111 of the collection lens 110 onto the light sensing device 115. In embodiments where relay lenses are used to create optical equivalents of the back focal plane of the collection lens, the diameter of the relay lens is preferably greater than or equal to an aperture stop located at the back focal plane (not shown in FIG. 1) of the collection lens and has a magnification preferably equal to the diameter of the light sensing device divided by the diameter of the aperture stop.

In an alternative embodiment, the light sensing device may be a camera or other device that is capable of producing all image corresponding to the optical image at the back focal plane 111 of collection lens 110, the image being computer readable to produce optical force measurements acting on the particle 108.

To preclude saturation of a light sensing device 115, such as a PSD, a neutral light filter 113 may be placed in the optical path between the collection lens 110 and the light sensing device 115 to attenuate light coming from the trap.

Figure 7:
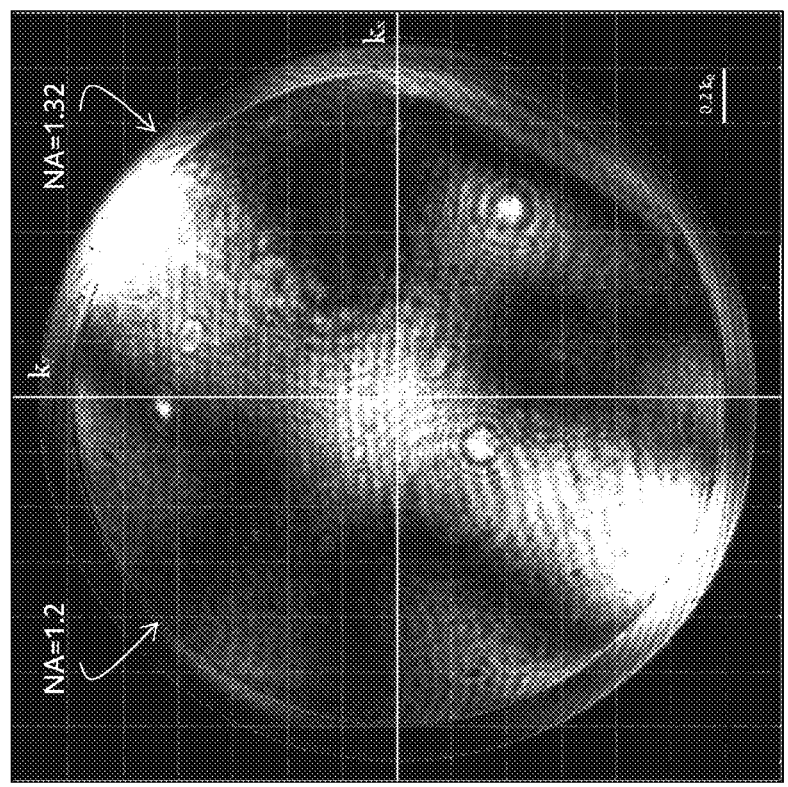
FIG. 7 shows an image of the back focal plane of an oil-immersion microscope condenser generated in accordance with the principles of the present invention.

FIG. 7 shows an image of the back focal plane of an oil-immersion microscope condenser with a numerical aperture of 1.40, which is collecting light scattered by a 3 μm polystyrene microsphere suspended in water (n=1.32 for λ=1.064 μm), trapped with a single-beam optical trap created with a water-immersion microscope objective having a numerical aperture of 1.20, and brought into contact with the exit cover 109b (h=0) of chamber 109. The plane can be calibrated in terms of numerical aperture by imaging the aperture stop of several microscope objectives with known characteristics. Alternatively, a diffraction grating of known period illuminated by a collimated beam of known wavelength diffracts light at known angles, which are focused into single spots at the back focal plane. These diffraction orders can also be used to calibrate the focal plane. The image shows light being collected close to the theoretical limit of NA=1.32 (corresponding to semi-angles close to 90° inside the water) as is easily visible in the upper right and bottom left corners of the image. The intensity of collected light determined experimentally is close to 95% of the total beam intensity (reading without sample, equivalent to light scattered in the whole 4π sphere). As a comparison, when the effective numerical aperture of the collecting lens is reduced to 0.95, light losses amount to some 15%-30% of the total light scattered by the sample. Notice that constant and uniform (not angle-dependent) light losses are irrelevant for the force measurements, as they would produce exactly the same light patterns at the back focal plane, but just dimmer. The signal from the PSD would be smaller (but proportional) and can be accounted for with the use of a calibration constant, C, as discussed, below.

In one embodiment, angle-dependent reflection losses at the suspension medium 406 and exit cover 109b interface can be reduced or eliminated with a wide-angle anti-reflection coating on the inside of the exit cover 109b tuned to the wavelength of the laser. Alternatively, a non-uniform transmission mask (not shown in FIG. 1) with amplitude proportional to the inverse of the reflection factors can be placed at the back focal plane of the collecting lens or at its conjugates (for example, at the PSD), since parallel bundles of light inside the suspension chamber are focused into single points at these planes.

As mentioned above and in contrast to indirect methods for force determination (such as trap stiffness calibration, based on models) the present invention is based on first principles.

Once the proportionality constant, C, between the readings of the PSD (in volts) and the light force (in pN) is found, measurements can be done regardless of changes in the experimental conditions such as temperature, indices of refraction, sample size and shape, laser power and trap geometry, etc.

Figure 8:
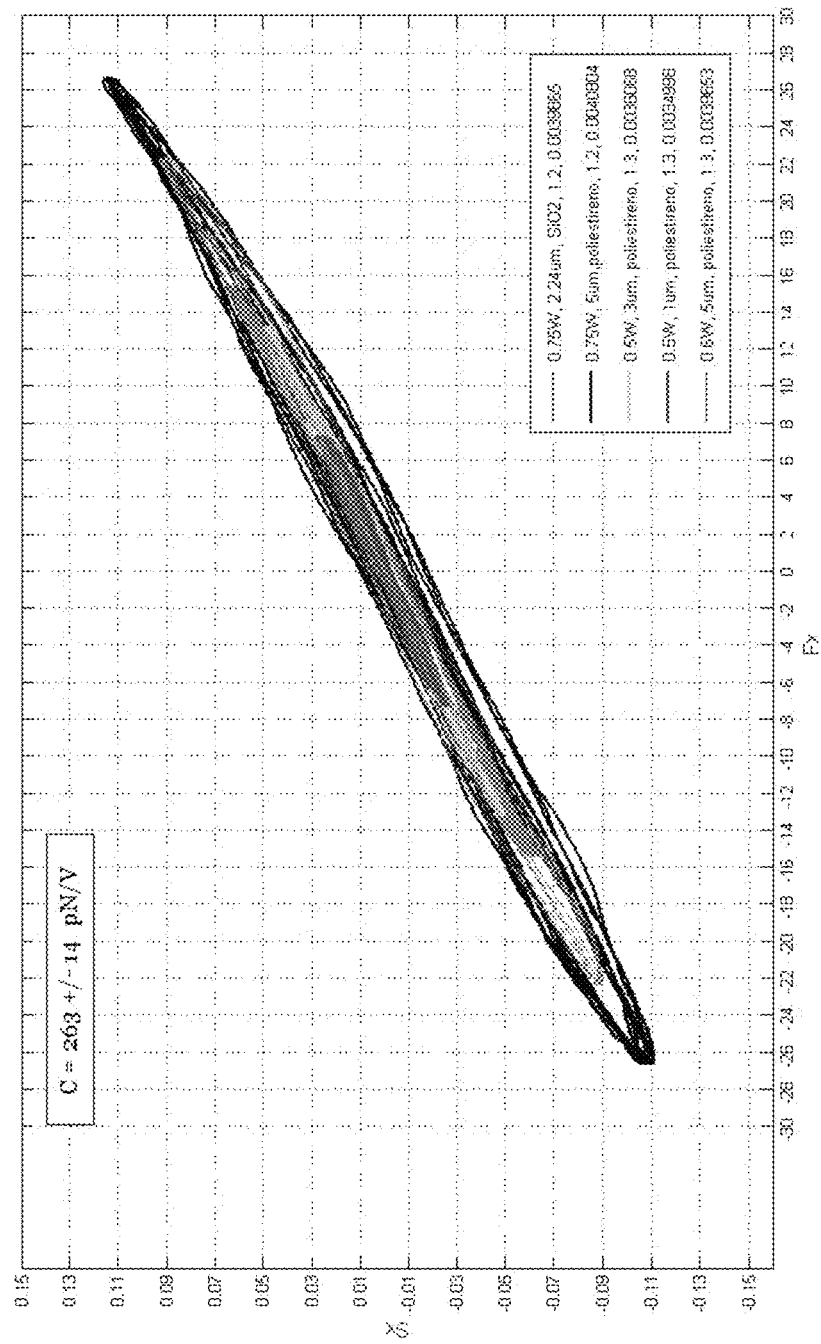
FIG. 8 shows the results of an experiment in which a known force was exerted on trapped polystyrene microspheres of different diameters, indices of refraction, at different laser powers and with different trap objectives for creating the optical trap.

FIG. 8 shows the results of an experiment in which known forces were exerted on trapped polystyrene microspheres of different diameters, indices of refraction, at different laser powers and with different trap objectives for creating the optical trap. The external force was made with controlled fluxes of the suspension fluid, achieved by moving a piezoelectric stage that held the microchamber at given velocities. The induced Stokes force on the bead was calculated, since the fluid velocity, its viscosity and the radius of the particle were all known. The force acts on the particle to shift the particle laterally off its resting position until the force exerted by the trap cancels the viscous drag. The actual optical force exerted by the trap can therefore be determined for these particular conditions. The plot shows the relation between the readings at a PSD following a method of the present invention (in the y-axis) versus the known optical force (Stokes force, x-axis), when the piezo-stage was driven by a sinusoidal signal.

The linear relationship and the independence of the average slope with the varying experimental conditions are evident in FIG. 8. Also, the inverse of this slope is the calibration constant, C (in pN/V) that allows the PSD readings to be converted into optical force. Therefore, the experiment establishes also a method for measuring constant C.

Returning to FIG. 1, first and second dichroic mirrors, 105 and 122, respectively, may be incorporated into the system 100 to permit the optical trap to coexist within the image train of an optical microscope by selectively reflecting the optical trap laser light while permitting other light wavelengths to pass. For example, dichroic mirror 112 may be incorporated within the illumination train of an optical microscope whereas diochroic mirror 105 may be incorporated within the imaging train of the microscope.

Figure 9:
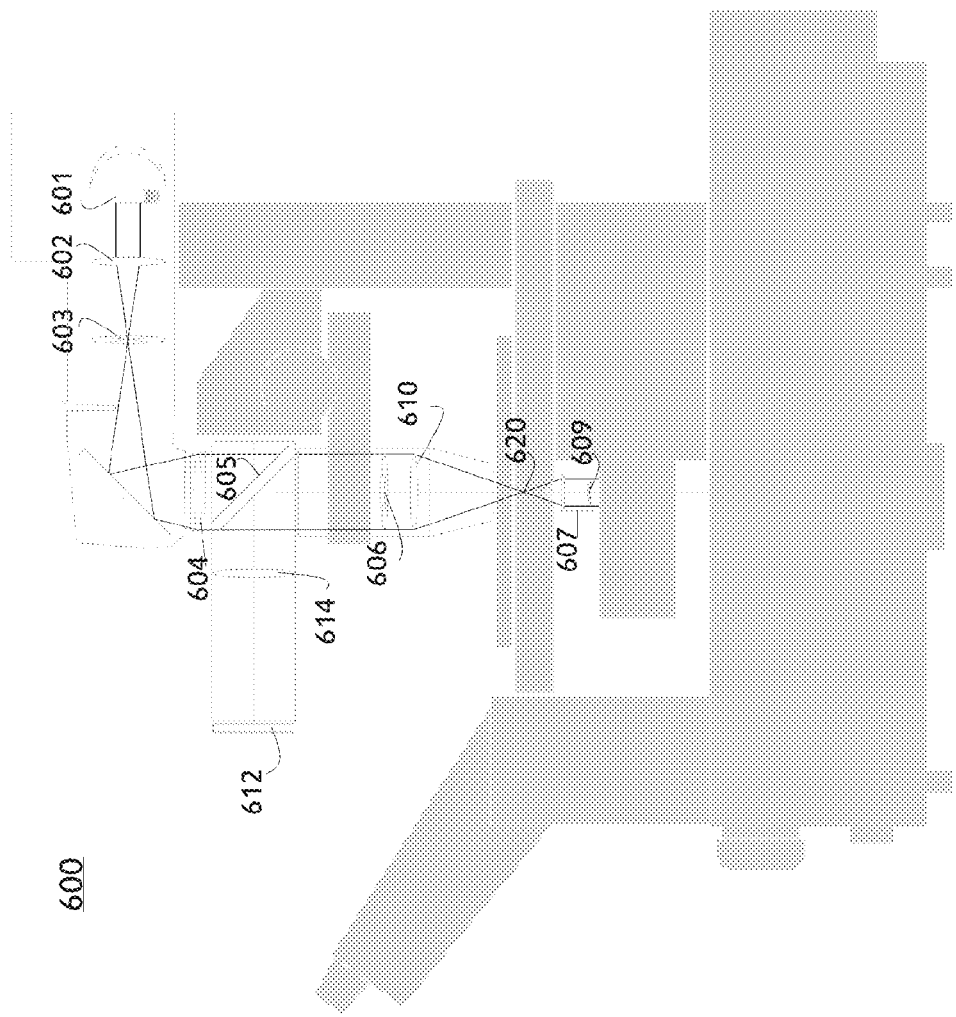
FIGS. 9A and 9B illustrate an embodiment of the present invention that is integrated with an optical microscope.

As illustrated in FIGS. 9A and 9B, a collecting lens according to the present invention which captures and decomposes light into its constituent momenta can very well be an immersion condenser, mounted on a regular optical microscope 600. The microscope, on the other hand, can concurrently be retrofitted with an optical tweezer to form a complete system. Commercial optical tweezers are readily available, compatible with the major brands of research microscopes, and which use the microscope objectives themselves to create the optical trap.

FIGS. 9A and 9B illustrate the compatibility of the method and system of the present invention with a regular optical microscope 600, as it easily fits into the optical train of, for example, a Köhler illuminator. FIG. 9A schematically shows the image train and FIG. 9B the illumination train of an inverted optical microscope, similar to those used in conjunction with optical trapping systems.

In FIG. 9B light from a halogen lamp 601 is redirected by a collector lens 602 through a field stop 603 and is focused onto the aperture stop 606 of the condenser lens 610 by collimating lens 604. Since the aperture stop 606 is located at the back-focal plane of the condenser lens 610, the light is collimated after the condenser, illuminates the sample 608 and is focused by the objective 607 onto its aperture stop 609, located at its back focal plane. Also, and in reference to FIG. 9A, the field stop 603 is imaged by collimator 604 and the lenses of condenser 610 onto the sample plane. The two optical trains can be described as a series of conjugate planes. For example, in the image train, the sample plane 608 and the field stop 603 are conjugates whereas in the illumination train, the halogen lamp 601, the aperture stop 606 of the condenser 610 and the aperture stop 609 of the objective 607 are also conjugates. Importantly, the conjugate planes of the illumination train can be said to be in a Fourier-transform relation with those in the image train, as they are at the back-focal plane of intermediate lenses. Particularly, the condenser aperture stop 606 forms a Fourier pair with the sample plane 608. This structure can naturally be used to integrate the measuring system of the present invention into the illumination train as shown in FIG. 9B. A high numerical aperture lens 610 having a numerical aperture greater than or equal to the index of refraction of the medium intended to suspend a sample (a modified oil-immersion condenser, for example), replaces the usual condenser, working in reverse as a collecting lens. A dichroic mirror 605 may be used to redirect the light coming from the trap to a light sensing device 612, such as a PSD, which is placed at the back focal plane of the collecting lens, or an optical equivalent thereof. Light coming from the illuminator in the opposite direction goes through the dichroic mirror 605 and reaches the sample as before. A relay lens 614 may be used when the back focal plane of lens 610 is not readily available (as shown in FIG. 9B), imaging the plane onto the PSD. In such an implementation, the microscope may remain fully functional.

Figure 10:
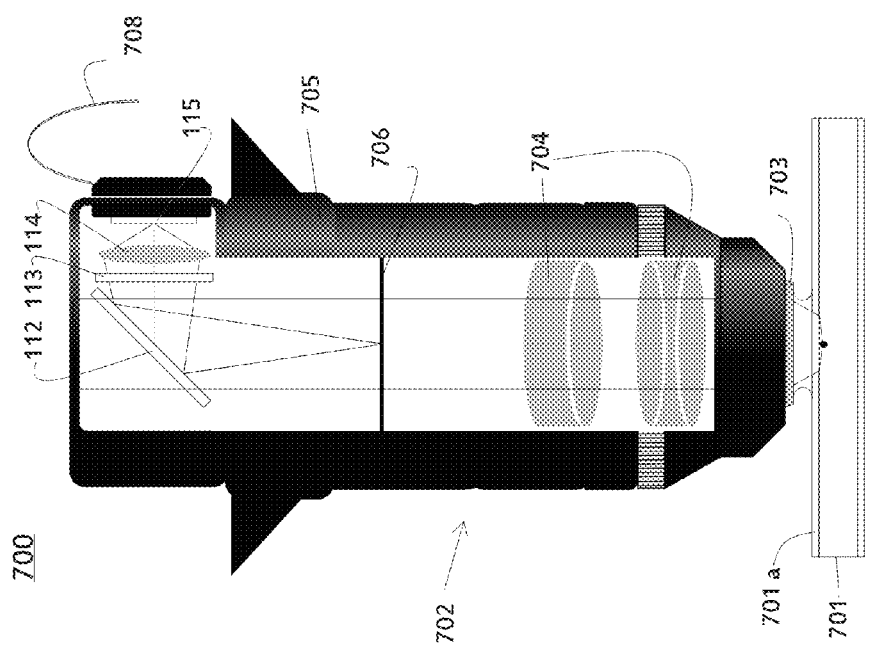
FIG. 10 illustrates a system/device in one embodiment adaptable for placement in the optical train of an optical microscope to permit the measurement of optical forces acting on a trapped particle suspended within a medium inside a suspension chamber.

FIG. 10 illustrates a system/device 700 adaptable for placement in the optical train of an optical microscope to permit the measurement of optical forces acting on a trapped particle suspended within a medium inside a suspension chamber 701. The device is configured to substitute the condenser lens of the microscope. In the embodiment of FIG. 10, the device includes a collection lens 702 having a front lens 703 and one or more internal lenses 704. The function and structure of the collection lens 702 is similar to the collection lens 110 discussed above with the exception that the light sensing device 115, filter 113 and relay lens 114 are integrated with the collection lens 702 to preferable form a single device. In the embodiment shown, the light sensing device 115, such as a PSD or camera, is attached to a side wall of the collection lens housing 705. In alternative embodiments, the light sensing device 115 is attached to the housing 705 of the collection lens 702 but is spaced a distance from the side wall by the use of a bracket or other suitable means. Located within the housing 705 is a relay lens 114 that images the light field at the back focal plane 706 onto the light sensing device 115. A dichroic mirror 112 deflects the light coming from the trap into the light sensing device 115 while permitting light of different wavelengths to pass through the lens. Filter 113 is positioned between dichroic mirror 112 and light sensing device 115 to attenuate the deflected light to prevent saturation of the light sensing device. The light sensing device 115 is preferably connectable to a computer or other device via one or more connectors or cables 708 or via wireless transmission to produce force measurements in a readable format. The collection lens 702 is designed to interface with the exit cover 701a of the suspension chamber 701 via an immersion medium, such as water or oil and is designed to have a numerical aperture greater than or equal to the index of refraction of the medium intended to suspend the sample within chamber 701. In an alternative embodiment, a spacer may be removably attached to the collection lens 702 or integrally formed with the housing 705 with the function of maintaining a desired working distance, w, between the collection lens and the exit cover 701a of chamber 701.

Figure 11:
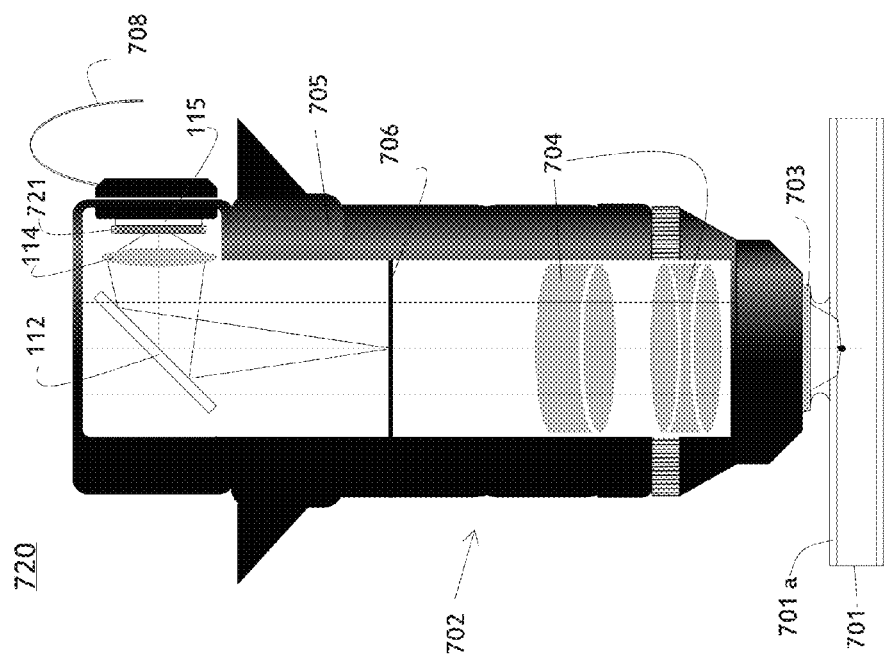
FIG. 11 illustrates a system/device in another embodiment adaptable for placement in the optical train of an optical microscope to permit the measurement of optical forces acting on a trapped particle suspended within a medium inside a suspension chamber.

FIG. 11 illustrates a system/device 720 adaptable for placement in the optical train of an optical microscope to permit the measurement of optical forces acting on a trapped particle suspended within a medium inside a suspension chamber 701. The device is configured to substitute the condenser lens of the microscope. In the embodiment of FIG. 11, the device includes a collection lens 702 having a front lens 703 and one or more internal lenses 704. The function and structure of the collection lens 702 is similar to the collection lens 110 discussed above with the exception that the light sensing device 115, relay lens 114 and a transmission mask 721 are integrated with the collection lens 702 to preferable form a single device. In the embodiment shown, the light sensing device 115, such as a PSD or camera, is attached to a side wall of the collection lens housing 705. In alternative embodiments, the light sensing device 115 is attached to the housing 705 of the collection lens 702 but is spaced a distance from the side wall by the use of a bracket or other suitable means. Located within the housing 705 is the relay lens 114 that images the light field at the back focal plane 706 onto the light sensing device 115. A dichroic mirror 112 deflects the light coming from the trap into the light sensing device 115 while permitting light of different wavelengths to pass through the lens. The transmission mask 721, positioned near or preferably at the light sensing device 115, is provided to compensate for reflection losses that are expected to occur at the exit cover 701a of the sample suspension chamber 701. The light sensing device 115 is preferably connectable to a computer or other device via one or more connections or cables 708 or via wireless transmission to produce force measurements in a readable format. The collection lens 702 is designed to interface with the exit cover 701a of the suspension chamber 701 via an immersion medium, such as water or oil and is designed to have a numerical aperture greater than or equal to the index of refraction of the medium intended to suspend the sample within chamber 701. In an alternative embodiment, a spacer may be removably attached to the collection lens or integrally formed with the housing 705, the spacer functioning to maintain a desired working distance, w, between the collection lens 702 and the exit cover 701a of chamber 701.

Figure 12:
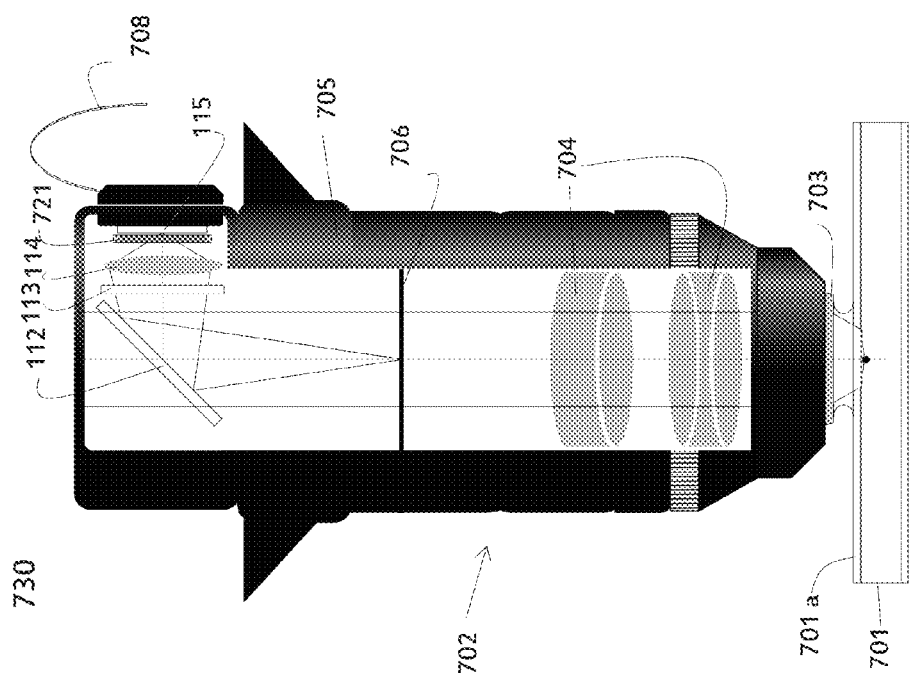
FIG. 12 illustrates a system/device in yet another embodiment adaptable for placement in the optical train of an optical microscope to permit the measurement of optical forces acting on a trapped particle suspended within a medium inside a suspension chamber.

FIG. 12 illustrates a system/device 730 adaptable for placement in the optical train of an optical microscope to permit the measurement of optical forces acting on a trapped particle suspended within a medium inside a suspension chamber 701. The device is configured to substitute the condenser lens of the microscope. In the embodiment of FIG. 12, the device includes a collection lens 702 having a front lens 703 and one or more internal lenses 704. The function and structure of the collection lens 702 is similar to the collection lens 110 discussed above with the exception that the light sensing device 115, filter 113, relay lens 114 and transmission mask 721 are integrated with the collection lens 702 to preferable form a single device. In the embodiment shown, the light sensing device 115, such as a PSD or camera, is attached to a side wall of the collection lens housing 705. In alternative embodiments, the light sensing device 115 is attached to the housing 705 of the collection lens 702 but is spaced a distance from the side wall by the use of a bracket or other suitable means. Located within the housing 705 is a relay lens 114 that images the light field at the back focal plane 706 onto the light sensing device 115. A dichroic mirror 112 deflects the light coming from the trap into the light sensing device 115 while permitting light of different wavelengths to pass through the lens. Filter 113 is positioned between dichroic mirror 112 and light sensing device 115 to attenuate the deflected light to prevent saturation of the light sensing device. The transmission mask 721, positioned near or preferably at the light sensing device 115, is provided to compensate for reflection losses that are expected to occur at the exit cover 701a of the sample suspension chamber 701. The light sensing device 115 is preferably connectable to a computer or other device via one or more connectors or cables 708 or via wireless transmission to produce force measurements in a readable format. The collection lens 702 is designed to interface with the exit cover 701a of the suspension chamber 701 via an immersion medium, such as water or oil and is designed to have a numerical aperture greater than or equal to the index of refraction of the medium intended to suspend the sample within chamber 701. In an alternative embodiment, a spacer may be removably attached to the collection lens or integrally formed with the housing 705 with the function of maintaining a desired working distance, w, between the collection lens and the exit cover 701a of chamber 701.

Figure 13:
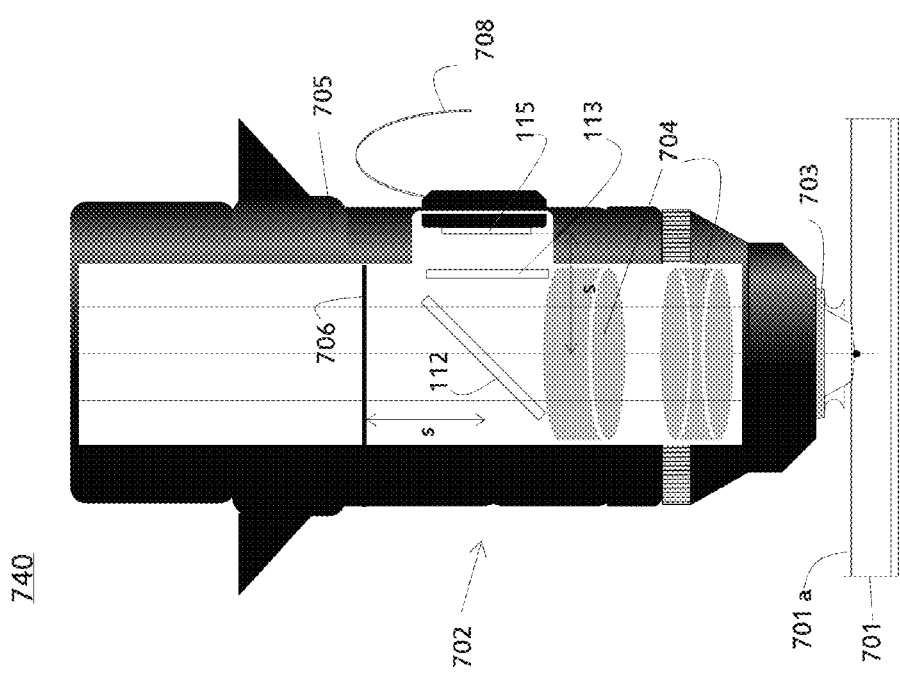
FIG. 13 illustrates a system/device in another embodiment adaptable for placement in the optical train of an optical microscope to permit the measurement of optical forces acting on a trapped particle suspended within a medium inside a suspension chamber.

FIG. 13 illustrates a system/device 740 adaptable for placement in the optical train of an optical microscope to permit the measurement of optical forces acting on a trapped particle suspended within a medium inside a suspension chamber 701. The device is configured to substitute the condenser lens of the microscope. In the embodiment of FIG. 13, the device includes a collection lens 702 having a front lens 703 and one or more internal lenses 704. The function and structure of the collection lens 702 is similar to the collection lens 110 discussed above with the exception that the light sensing device 115, filter 113 are integrated with the collection lens 702 to preferable form a single device with the light sensing device 115 being located at or near the back focal plane of the collection lens 702. A dichroic mirror 112 located within the collection lens housing 705 deflects the light field going to the back focal plane of collection lens 702 into the light sensing device 115 while permitting light of different wavelengths to pass through the lens. To properly translate the back focal plane onto the light sensing device, the distances "s" between the mirror 112 and back focal plane 706 and the mirror 112 and light sensing device 115 are made to be equal or substantially equal. Filter 113 is positioned between the dichroic mirror 112 and the light sensing device 115 to attenuate the deflected light to prevent saturation of the light sensing device. The light sensing device 115 is preferably connectable to a computer or other device via one or more connectors or cables 708 or via wireless transmission to produce force measurements in a readable format. The collection lens 702 is designed to interface with the exit cover 701a of the suspension chamber 701 via an immersion medium, such as water or oil and is designed to have a numerical aperture greater than or equal to the index of refraction of the medium intended to suspend the sample within chamber 701. In an alternative embodiment, a spacer may be removably attached to the collection lens or integrally formed with the housing 705 with the function of maintaining a desired working distance, w, between the collection lens and the exit cover 701a of chamber 701.

Figure 14:
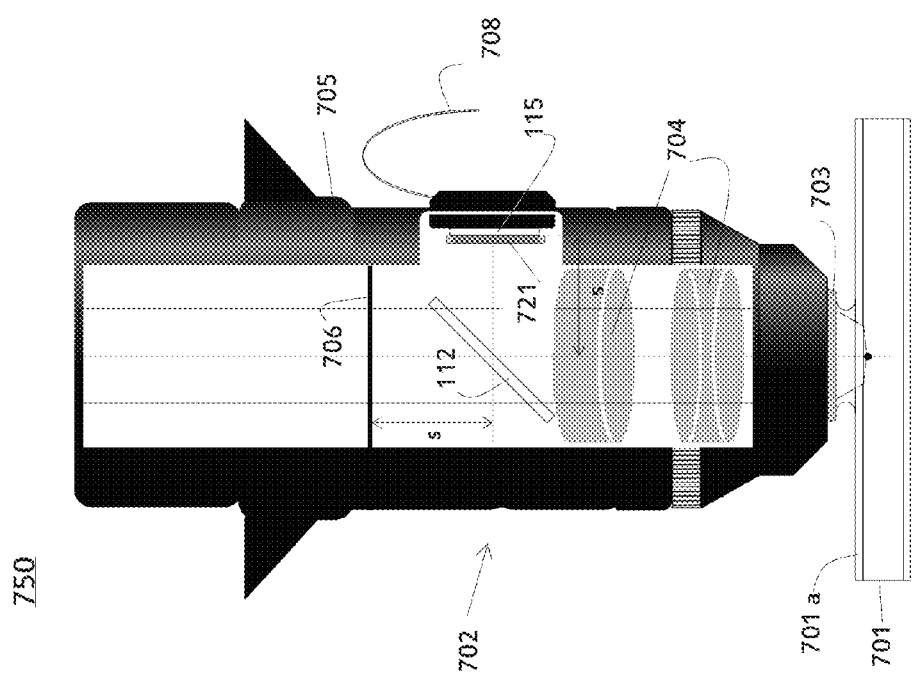
FIG. 14 illustrates a system/device in another embodiment adaptable for placement in the optical train of an optical microscope to permit the measurement of optical forces acting on a trapped particle suspended within a medium inside a suspension chamber.

FIG. 14 illustrates a system/device 750 adaptable for placement in the optical train of an optical microscope to permit the measurement of optical forces acting on a trapped particle suspended within a medium inside a suspension chamber 701. The device is configured to substitute the condenser lens of the microscope. In the embodiment of FIG. 14, the device includes a collection lens 702 having a front lens 703 and one or more internal lenses 704. The function and structure of the collection lens 702 is similar to the collection lens 110 discussed above with the exception that a light sensing device 115 and a transmission mask 721 are integrated with the collection lens 702 to preferable form a single device with the light sensing device 115 being located at or near the back focal plane of the collection lens 702. A dichroic mirror 112 located within the collection lens housing 705 deflects the light field going to the back focal plane of collection lens 702 into the light sensing device 115 while permitting light of different wavelengths to pass through the lens. To properly translate the back focal plane onto the light sensing device, the distances "s" between the mirror 112 and back focal plane 706 and the mirror 112 and light sensing device 115 are made to be equal or substantially equal. The transmission mask 721, which is positioned in the same plane as the light sensing device 115, is provided to compensate for reflection losses that are expected to occur at the exit cover 701a of the sample suspension chamber 701. The light sensing device 115 is preferably connectable to a computer or other device via one or more connectors or cables 708 or via wireless transmission to produce force measurements in a readable format. The collection lens 702 is designed to interface with the exit cover 701a of the suspension chamber 701 via an immersion medium, such as water or oil and is designed to have a numerical aperture greater than or equal to the index of refraction of the medium intended to suspend the sample within chamber 701. In an alternative embodiment, a spacer may be removably attached to the collection lens or integrally formed with the housing 705 with the function of maintaining a desired working distance, w, between the collection lens and the exit cover 701a of chamber 701.

Figure 15:
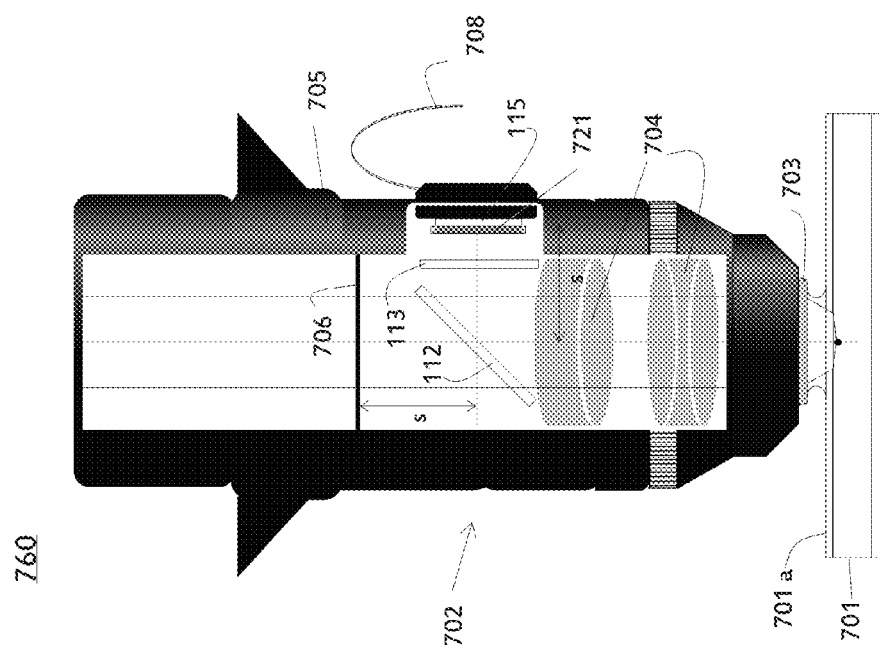
FIG. 15 illustrates a system/device in yet another embodiment adaptable for placement in the optical train of an optical microscope to permit the measurement of optical forces acting on a trapped particle suspended within a medium inside a suspension chamber.

FIG. 15 illustrates a system/device 760 adaptable for placement in the optical train of an optical microscope to permit the measurement of optical forces acting on a trapped particle suspended within a medium inside a suspension chamber 701. The device is configured to substitute the condenser lens of the microscope. In the embodiment of FIG. 15, the device includes a collection lens 702 having a front lens 703 and one or more internal lenses 704. The function and structure of the collection lens 702 is similar to the collection lens 110 discussed above with the exception that a light sensing device 115, a filter 113, and a transmission mask 721 are integrated with the collection lens 702 to preferable form a single device with the light sensing device 115 being located at or near the back focal plane of the collection lens 702. A dichroic mirror 112 located within the collection lens housing 705 deflects the light field going to the back focal plane of collection lens 702 into the light sensing device 115 while permitting light of different wavelengths to pass through the lens. To properly translate the back focal plane onto the light sensing device, the distances "s" between the mirror 112 and back focal plane 706 and the mirror 112 and light sensing device 115 are made to be equal or substantially equal. Filter 113 is positioned between the dichroic mirror 112 and the light sensing device 115 to attenuate the deflected light to prevent saturation of the light sensing device. The transmission mask 721, positioned in the same plane as the light sensing device 115, is provided to compensate for reflection losses that are expected to occur at the exit cover 701a of the sample suspension chamber 701. The light sensing device 115 is preferably connectable to a computer or other device via one or more connectors or cables 708 or via wireless transmission to produce force measurements in a readable format. The collection lens 702 is designed to interface with the exit cover 701a of the suspension chamber 701 via an immersion medium, such as water or oil and is designed to have a numerical aperture greater than or equal to the index of refraction of the medium intended to suspend the sample within chamber 701. In an alternative embodiment, a spacer may be removably attached to the collection lens or integrally formed with the housing 705 with the function of maintaining a desired working distance, w, between the collection lens and the exit cover 701a of chamber 701.

Returning again to FIG. 1, it is important to note that system 100 may comprise less than every component depicted. In addition, other combinations of elements and/or components may be integrated into a system or device to measure optical forces acting on a particle without deviating from the scope and breadth of the present invention. In one embodiment the system may comprise the light source 101, chamber 109, the high numerical aperture trap objective lens 107, the collection lens 110 having a numerical aperture greater than or equal to the index of refraction of a suspension medium intended to suspend the particle in the chamber, and a light sensing device positioned at or near the back focal plane of the collection lens, or at an optical equivalent thereof. With respect to components 102, 104, 105, 112, 114, 130 and 132, they may individually, or in combination with one or more of the other components, be omitted from the system. For example, it is not necessary that the system be integrated within the optical train of a microscope. In such systems, the laser source 101 and light sensing device may be aligned in series with optical path way of the trap objective 107 and collection lens 110 thus obviating the need for dichroic mirrors 105 and 112. In addition, it is contemplated that a laser source 101 may be constructed to produce a collimated and circular polarized light beam that is capable of directly filling or overfilling the entrance pupil 106 of the trap objective 107 without the need for one or more of components 102, 103, 130, 132 and 104. It is contemplated that additional components or features may be incorporated into system 100 to enhance system performance without deviating from the spirit and scope of the present invention.

The invention claimed is:

1. A system for detecting light momentum changes to measure optical forces acting on a particle, comprising:
   a light source for generating a single light beam,
   a chamber for containing a particle in a suspension medium,
   a high numerical aperture trap objective lens for focusing the light beam on the particle in a manner to cause light beam photons to trap the particle by use of high gradient forces,
   a single collection lens positioned to capture in the upper hemisphere of the particle to be trapped both photons deflected by the particle and photons not deflected by the particle, the collection lens having a numerical aperture greater than or equal to the index of refraction of a suspension medium intended to suspend the particle in the chamber; and
   a light sensing device positioned at or near the back focal plane of the collection lens, or at an optical equivalent thereof.

2. A system according to claim 1, wherein the collection lens has a numerical aperture of between about 1.32 to about 1.40.

3. A system according to claim 1, wherein the light sensing device is a position sensing device or a camera.

4. A system according to claim 3, wherein the position sensing device is a duolateral detector type which produces two electrical signals proportional to the x and y coordinates of the centroid of the light distribution imaged onto the position sensing device.

5. A system according to claim 4, wherein the collection lens is designed to fulfill Abbe's sine condition.

6. A system according to claim 1 wherein the chamber includes an exit cover, the apparatus further comprising a transmission mask positioned at or near the light sensing device that compensates for reflection losses at the exit cover.

7. A system according to claim 1 further comprising a relay lens that images an optical equivalent of the light distribution at or near the back focal plane onto the light sensing device.

8. A system according to claim 1 wherein the trap objective lens has an entrance pupil, the apparatus further comprising one or more lenses positioned between the light source and the entrance pupil, the one or more lenses configured to alter the diameter of the light beam to fill or slightly overfill the entrance pupil of the trap objective lens.

9. The system according to claim 1 further comprising a spacer positioned to maintain a particular working distance between the sample and a front lens of the collection lens.

10. A method for detecting light momentum changes to measure optical forces acting on a particle, comprising:
   suspending the particle in a suspension medium within a chamber,
   focusing a single light beam on the particle to cause beam photons to trap the particle by use of high gradient forces with the use of a high numerical aperture objective lens,
   capturing in the upper hemisphere of the particle photons deflected by the particle and photons not deflected by the particle by a single collection lens system, the collection lens system having a numerical aperture greater than or equal to the index of refraction of the suspension fluid; and
   directing the captured photons to a light sensing device located at or near the back focal plane of the collection lens, or at an optical equivalent thereof.

11. A method according to claim 10 further comprising producing electrical signals proportional to the x and y coordinates of the centroid of the light distribution imaged onto the light sensing device.

12. A method according to claim 10 wherein the chamber comprises an entry cover and an exit cover, the particle suspended nearer the exit cover than the entry cover.

13. A method according to claim 10 wherein the optical equivalent of the back focal plane is produced by a relay lens positioned between the collection lens and the light sensing device.

14. A method according to claim 10 wherein the chamber comprises an exit cover, the method further comprising compensating for reflection losses at the exit cover by using a non-uniform transmission mask positioned at or near the back focal plane, or an equivalent thereof.

15. A method according to claim 10 wherein the trap objective lens has an entrance pupil, the method further comprising filling or slightly overfilling the entrance pupil of the trap objective lens by modifying the diameter of a light beam directed to the entrance pupil.

16. A method according to claim 10 wherein the captured photons are directed to a position sensing device or a camera creating an optical image at the position sensing device or camera that corresponds to the optical image at or near the back focal plane of the collection lens.

17. A system adaptable for placement in the optical train of an optical microscope that is configured to trap with a single light beam a particle suspended in a suspension medium between an entry cover and an exit cover of a chamber, the system comprising:
   a single collection lens system for placement at or near the exit cover of the chamber of the microscope to capture in the upper hemisphere of the particle photons deflected by the particle and photons not deflected by the particle, the numerical aperture of the collection lens designed to be greater than or equal to a refraction index of the suspension medium intended to suspend the particle in the chamber; and
   a light sensing device positioned at or near the back focal plane of the collection lens, or at an optical equivalent thereof, the light sensing device capable of producing optical force measurements acting on the particle derived by the x and y coordinates of the centroid of the light distribution imaged onto the light sensing device.

18. A system according to claim 17 wherein the light sensing device is capable of producing electrical signals proportional to the x and y coordinates of the centroid of the light distribution imaged onto the light sensing device.

19. A system according to claim 17 wherein the light sensing device is a position sensing device or a camera.

20. A system according to claim 17 further comprising a relay lens positioned between a front lens of the collection lens and the light sensing device to create the optical equivalent of the back focal plane.

21. A system according to claim 17, wherein the collection lens has a numerical aperture of between about 1.32 to about 1.40.

22. A system according to claim 17 further comprising a transmission mask positioned near or at the light sensing device that compensates for reflection losses produced at the exit cover.

23. A system according to claim 19, wherein the position sensing device is a duolateral detector type which produces two electrical signals proportional to the x and y coordinates of the centroid of the light distribution imaged onto the position sensing device.

24. A system according to claim 17 wherein the collection lens is an oil immersion lens or a water immersion lens.

* * * * *